United States Patent Office 3,442,128
Patented May 6, 1969

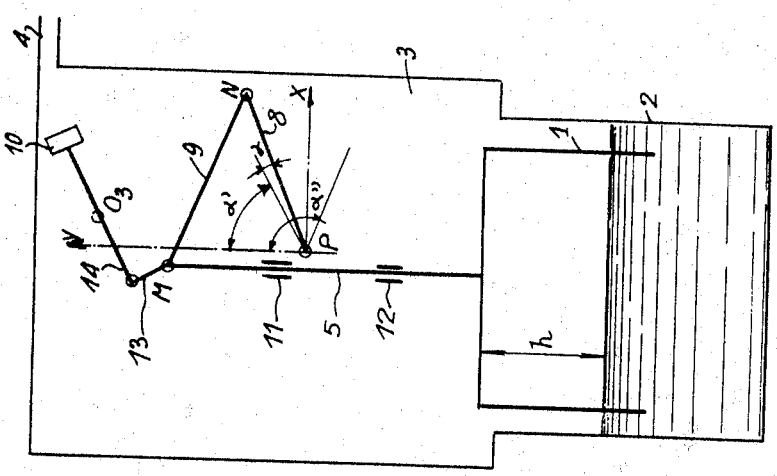
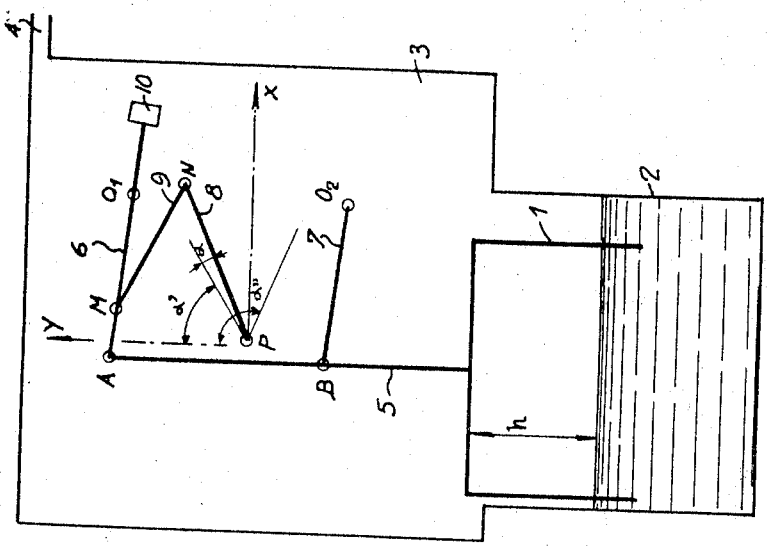

3,442,128
CORRECTING DEVICE FOR GASEOUS FLUID METERS
Martial Henri Mathias Muger, Bagneaux, France, assignor to Compagnie des Compteurs, Paris, France, a company of France
Filed Apr. 24, 1967, Ser. No. 633,120
Claims priority, application France, Apr. 28, 1966, 59,436
Int. Cl. G01k 1/26
U.S. Cl. 73—345                                 5 Claims

ABSTRACT OF THE DISCLOSURE

Correcting device associated with a gas meter for gaseous fluid having a variable temperature and pressure comprising a container such as a bellow fitted initially with a sample of gas at ambient temperature and pressure, an enclosure for the gas of unknown temperature and pressure containing also said container, a rod connected to said container and a set of levers pivotally connected to said rod to be angularly operated thereby, the angular displacement of said levers corresponding to a coefficient giving data for correction of the measured volume of gas by said meter.

---

The meters for gaseous fluid volumes integrate volumes V of fluids circulating under a pressure P and a temperature T. If the pressure and the temperature vary in time, this way of measuring volumes has no practical meaning. Therefore, it is appropriate to restore volumes so measured by the meter to a fixed reference state so that the measures may be comparable to each other. $P_0 = 760$ mm. Hg and $T_0 = 15°$ C. are generally taken as reference values. So, the invention relates to a thermomanometric corrector which gives a representation of the correcting coefficient by which it is appropriate to multiply the figures given by the meter to correct for temperature and pressure.

An important object of the present invention is to provide a device with levers by which to obtain, by way of an angular variation, the value of such correcting coefficient.

The invention relates still more particularly to thermomanometric correctors based upon the axial compression under the pressure exerted by the gas in the measuring conditions—of a cylindrical container enclosing a reference volume, that is, a certain volume of the gas to be measured at fixed reference temperature and pressure.

The movement of the container is guided by a rod, the axial displacement or the axial component of the displacement $\Delta h$ of any point of which corresponds to the variation of the volume occupied by said reference volume under measuring conditions. It is known that the correcting coefficient C by which it is appropriate to multiply the figures of the volume of gas so measured at any temperature and pressure conditions to restore the measuring result to fixed reference temperature and pressure is inversely proportional to $\Delta h$ and may be written:

$$C = a/\Delta h$$

wherein $a$ is a constant value.

The invention supplies by way of an angle $\alpha$ a simple and easily usable representation of the coefficient C by means of a device which solves the statement:

$$\alpha = A/\Delta h$$

wherein A is a constant value. The angle $\alpha$ is proportional to the correcting coefficient C and a simple angular variation gives the value of this coefficient.

According to the invention, the correcting device of the measure of gaseous fluid volumes by a meter of gaseous fluid volumes as a function of the variations in temperature and pressure of the gaseous fluid measured by the meter is characterized in that it comprises a distortable container containing a sample volume of the gaseous fluid introduced in said container under reference pressure and temperature, a casing defining an enclosure in which the gaseous fluid is introduced and in the inside of which is mounted said container, means carried by the container and axially moved by it in accordance with the extent of compression of the gaseous fluid sample contained in said container, at least two levers articulated with respect to each other, the first lever being connected to the means so displaced by said container and the second lever being articulated on a fixed axis, and means to measure the angular displacement of this second lever around its fixed axis of articulation.

Various other characteristics of the invention will moreover be revealed by the detailed description which follows with reference to the accompanying drawings in which:

FIGURE 1 is a diagrammatical view of the device according to a first embodiment of the invention.

FIGURE 2 is a diagrammatical view of the device according to another embodiment of the invention.

Figure 3:
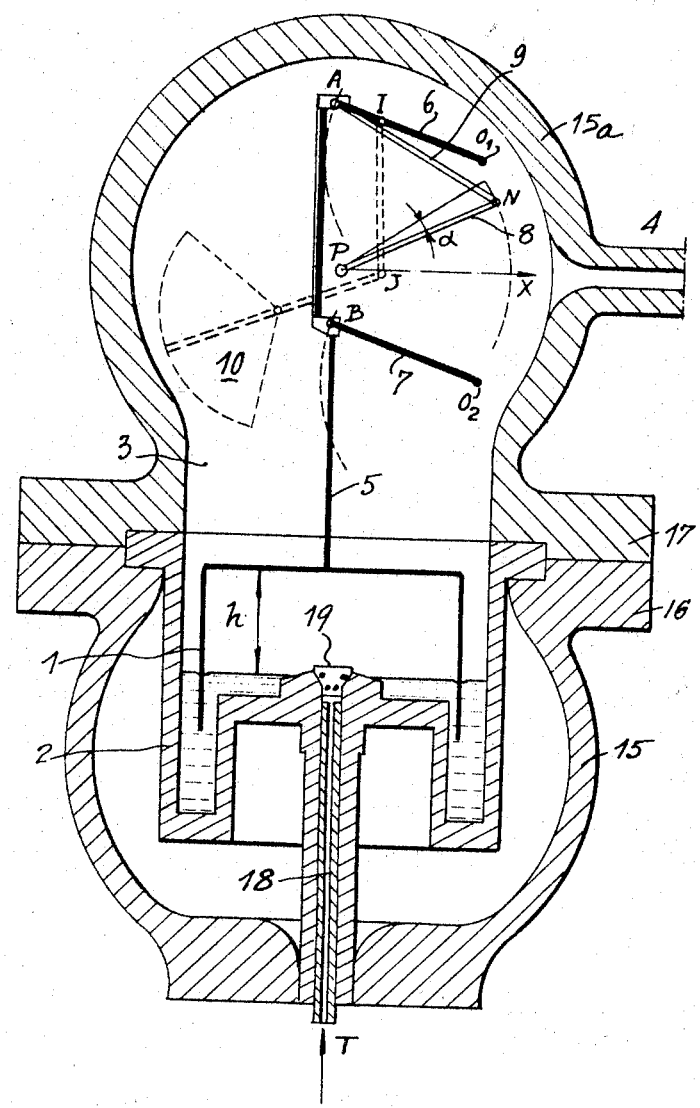
FIGURE 3 is a sectional view showing how the device of the invention may be realized.

In the drawing, reference numeral 1 indicates a bell-jar of a constant cross section throughout its height—for example cylindrical—the walls of which are thin, which bell-jar is partly immersed in a non-volatile liquid for instance mercury contained in a sink 2 communicating with an enclosure 3 in which opens a feeding duct 4 for the intake of the gaseous flow whose values, measured in a meter, have to be corrected for temperature and pressure. The meter per se, not shown, may be of any type, for instance, of the type having rotating piston or pistons, or of the type having a nutating disc etc., and need not be detailed as not being part of the invention. Inside the bell-jar 1 is initially enclosed a reference volume $V_r$ of the gas of duct 4 in the reference temperature and pressure conditions. In those circumstances, the height between the bottom of the bell-jar and the surface of the non-volatile liquid is $h_r$.

The bell-jar 1, with the gaseous fluid which it contains, constitutes a thermo-manometric container subjected to the same temperature and pressure as the gaseous fluid to be studied and conducted in the enclosure 3 through duct 4. If, when functioning, the temperature and the pressure of the gaseous fluid vary, either simultaneously or separately, then the height $h$ between the liquid and the bottom of the bell-jar varies and becomes $h_1$.

Maintaining the bell-jar 1 in a vertical position is ensured by way of a rod 5 connected to this bell-jar 1. The rod 5 whose displacements are connected to the variation in the weight $h$ is guided in FIGS. 1 and 3 by two connecting rods 6 and 7 respectively pivoting around fixed axes $O_1$ and $O_2$. The connecting rods 6 and 7 are also respectively articulated on axes A and B provided on the rod 5 such that length A–B is equal to length $O_1$–$O_2$. The quadrilateral $O_1ABO_2$ constitute a parallelogram which is distortable around fixed points $O_1$ and $O_2$. A lever 8, pivoting around a fixed axis P situated in the plane of the parallelogram, is articulated by its end N to a connecting rod 9 pivotally mounted on an axis M carried by the connecting rod 6. A counterweight 10 connected with the lever 6 balances the mobile assembly.

Thanks to a correct dimensioning of this system, the vertical displacement of the bell-jar $\Delta h = h_1 - h_r$ is converted to an angular displacement of the lever 8 around axis P. The measure α of this angular displacement represents the correcting factor C by which it is convenient to multiply the figures given by the meter to be restored to determinated reference conditions. This latter operation may be accomplished by a multiplying device of a known-type.

FIGURE 2 shows another embodiment in which same reference numerals are used to represent same parts as in FIG. 1. The rod 5 is guided in slides 11 and 12 assigning the rod to a rectilinear movement of translation. The axis of articulation M of lever 9 is carried by the rod 5. The axis M is connected by a small connecting rod 13 to a lever 14 articulated on an axis $O_3$ and whose end carries the counterweight 10.

FIGURE 3 shows that the sink 2 is advantageously mounted inside a casing 15 open its upper part and provided with a flange 16 on which is fixed the corresponding flange 17 of a second casing 15a defining the enclosure 3. The bottom of sink 2 is preferably shaped so that the volume of the non-volatile liquid so contained is as small as possible in order that the thermal inertia due to this liquid also be small. Moreover, the bottom of sink 2 constitutes a guiding passage for the tubular stem 18 of a valve 19 for introducing the gaseous fluid inside the bell-jar 1. Because of this structure, the device may be directly fixed on the meter with which it has to be united.

In this modification, the counter weight 10 may be applied at the end of the lever pivoted at an intermediate point to casing 15a and articulated at a free end J to a second lever which is articulated at point I to lever or rod 6.

The device so described does not call for any simple geometry. It results from a complicated study based upon adequate approximations which may be mathematically checked in order that the measuring results achieve a fair accuracy.

Functioning of the device requires a judicious choice of the length of the levers and of the relative position of the axes of articulation. In the embodiment according to FIG. 3, the error is always less than ±0.25% which is accurate enough, the preciseness sought for the meters provided with a corrector never being better than ±1%. Such a result has been obtained with the following dimensioning, length $O_1A$ of connecting rod 6 being taken as unity:

$$O_1A = O_1M = O_2B = 1$$
$$PN = 1.0600$$
$$NA = 1.1733$$
$$x = 0.7137$$
$$y = 0.8660$$

$x$ and $y$ being the coordinates of point $O_1$ in the rectangular axes $Px$, $Py$, the axis $Px$ being horizontal. The error remains within the preceding limits when the angle of PN with rod 5 varies within the limits:

$$\alpha' = 0.902 \text{ rad.}$$
$$\alpha'' = 1.950 \text{ rad.}$$

By using values similar to those above mentioned, it becomes possible within the same accuracy to take into account some secondary factors such as expansion of the ords, Archimedean thrust exerted on the bell-jar 1, thermal inertia constituted by the liquid, rising of the liquid level when the bell is sinking, etc. In the particular case of embodiment according to FIGS. 1 and 3, it is also possible to take into account analogous factors by adopting different length values for AB and $O_1O_2$. The influence of the variation in temperature upon the elements of the system may be corrected by using rods with different expansion coefficients, but this variation in temperature is generally small during the measuring.

The present invention is not restricted to the embodiments shown and described in detail, since several changes may be made thereto without going outside its scope. In particular, the container may be provided by any means equivalent to the bell-jar as by a bellows.

I claim:
1. Device for determining the correction factor for a gaseous fluid volume meter due to variations in temperature and pressure of the gaseous fluid measured by the meter, which comprises a distortable container containing a sample volume of the gaseous fluid introduced in said container under reference pressure and temperature, a casing defining an enclosure in which the gaseous fluid is introduced and in the inside of which is mounted said container, means carried by the container and axially moved by it according to variation in the extent of compression of the gaseous fluid sample contained in said container; at least two levers articulated to each other, the first one being connected to the means so displaced by said container for movement therewith and the second lever being articulated on a fixed axis, and means to measure the angular displacement of said second lever around its fixed axis of articulation.

2. A device according to claim 1, which further comprises two parallel connecting rods pivotally mounted at one end on fixed axes and pivotally mounted at the other end on said means so moved by said container to guide said means, an axis of articulation being carried by one of said connecting rods to articulate said first lever so connected to said means moved by said container.

3. A device according to claim 1, in which said means connected to said container comprises a rod fixed to said container, means for axially guiding this rod being provided within the casing defining said enclosure.

4. A device according to claim 1, which further comprises at least one lever articulated with said means moved by said container and pivoted to said casing and at least one counterweight carried by this lever to statically balance said means moved by said container.

5. Correcting device according to claim 1, in which said container containing said gaseous fluid sample comprises a sink, a non-volatile liquid at least partially filling said sink and a bell-jar containing said gaseous fluid sample and partly immersed in said liquid.

References Cited

UNITED STATES PATENTS

| | | | |
|---|---|---|---|
| 1,396,817 | 11/1921 | Dezendorf | 73—3 |
| 1,422,089 | 7/1922 | Dezendorf | 73—3 |

LOUIS R. PRINCE, *Primary Examiner.*

DENIS E. CORR, *Assistant Examiner.*

U.S. Cl. X.R.

73—232, 239, 389